J. A. LAWSON.
COMBINED TURBINE MUFFLER AND FLY WHEEL.
APPLICATION FILED DEC. 22, 1908.
938,253.
Patented Oct. 26, 1909.
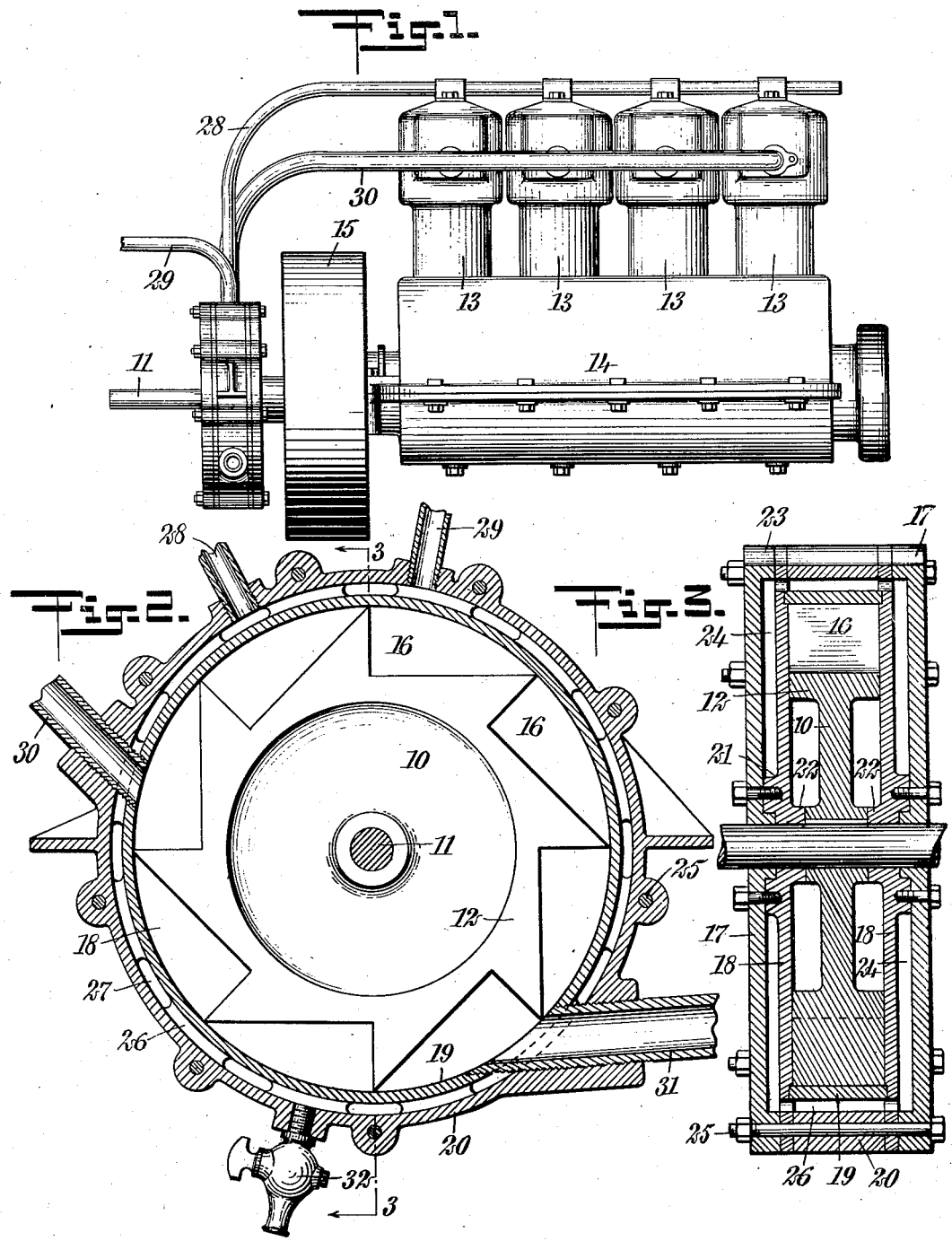
WITNESSES
INVENTOR
John A. Lawson
BY Munn & Co
ATTORNEYS

UNITED STATES PATENT OFFICE.

JOHN A. LAWSON, OF NEW YORK, N. Y.

COMBINED TURBINE-MUFFLER AND FLY-WHEEL.

938,253.  Specification of Letters Patent.  Patented Oct. 26, 1909.

Application filed December 22, 1908. Serial No. 468,829.

*To all whom it may concern:*

Be it known that I, JOHN A. LAWSON, a citizen of the United States, and a resident of the city of New York, borough of Brooklyn, in the county of Kings and State of New York, have invented a new and Improved Combined Turbine - Muffler and Fly - Wheel, of which the following is a full, clear, and exact description.

It is customary to use in connection with internal combustion engines a muffler to deaden the sound of the explosions occurring within the cylinder, the muffler being connected to the exhaust pipe of the engine. The exhaust gas is usually delivered to the muffler at a comparatively high rate of speed and at a high temperature, so that a large quantity of power is continually wasted during the running of the engine. Attempts have been made to utilize the pressure of the exhaust gas in operating auxiliary mechanism, or in aiding the main engine, but so far as I am aware, all prior attempts of this character have been unsuccessful.

My invention involves a construction whereby I not only utilize the pressure of the gas, but I prevent the high temperature of the gas from injuring the wheel rotated thereby. This wheel is so constructed as to operate as a fly wheel, and, furthermore, I utilize the wheel in creating a partial vacuum at the exhaust valve or valves of the engine during the cranking or starting of the engine.

Reference is to be had to the accompanying drawings, forming a part of this specification, in which similar characters of reference indicate corresponding parts in all the figures, and in which—

Figure 1 is a side elevation of an engine provided with a combined turbine muffler and fly wheel constructed in accordance with my invention; Fig. 2 is a transverse section through the wheel and casing; and Fig. 3 is a longitudinal section taken on the line 3—3 of Fig. 2.

My improved device *per se* includes a wheel 10, directly connected to the crank shaft 11 of the engine and adapted to be rotated continuously during the operation of the engine. The outer peripheral portion of the wheel constitutes a thick heavy rim 12, so that the wheel possesses considerable weight, and when rotating serves as a fly wheel. In Fig. 1, I have illustrated an engine having a plurality of cylinders 13, a crank casing 14, an engine shaft 11, a flywheel 15, and my improved combined flywheel, muffler and turbine. My improved device may be used in connection with the fly wheel 15, or be used entirely independently thereof. Preferably, the fly-wheel 15 is removed and the wheel 10 of my device utilized as the sole fly-wheel.

The rim portion 12 of the wheel is provided with a plurality of pockets 16 in the peripheral surface thereof, and inclosing the wheel are two concentric casings held against rotation. The two casings may be constructed in any suitable manner, but preferably they are formed of two outer plates 17, two inner plates 18, and two concentric rings 19 and 20. The four plates lie parallel and concentric with the engine shaft, and the two inner plates are provided with outwardly-extending bosses 21 abutting against the outer plates to space the pairs of plates apart. The inner plates preferably have inwardly-extending bosses 22 for engaging with the ends of the hub of the wheel 10, to hold the latter against longitudinal movement. The outer plates have inwardly-directed flanges 23, adjacent their periphery, which contact with the outer surfaces of the two inner plates, to form two annular chambers 24. The inner plates are spaced apart at their outer periphery by the outer ring 20, and the plates 17 and 18 and the ring 20 are held rigid in respect to each other by an annular row of locking bolts 25. The inner ring 19 is spaced a short distance from the outer ring, so as to leave an annular chamber 26, and the inner ring is held in position by fitting into oppositely-disposed grooves in the faces of the two inner plates 18. The plates 18, intermediate the inner and outer rings, are provided with a plurality of openings 27, whereby the two annular side chambers 24 may communicate with the annular peripheral chamber 26. The outer ring 20 is provided with an inlet 28 and an outlet 29, whereby water may be circulated through the jacket formed of the three annular chambers. The inlet 28 is connected directly to the water outlet from the jackets of the several engine cylinders, so that no separate water-pumping mechanism need be employed. The outlet 29 may be connected to a cooler in case the engine is used on a motor vehicle, or may be run to waste in case the engine is used for marine purposes or where an unlimited supply of cooling water is available. The exhaust pipe 30 leading from the exhaust valves of the engine cylinders, is extended directly through both of the rings 19 and 20, so that the exhaust gas is discharged against the periphery of the wheel 10 substantially tangentially thereof.

The pockets 16 of the wheel, each have one face extending substantially radially of the wheel, and the exhaust gas in entering through the pipe 30 strikes this face to rotate the wheel by impact. An exhaust pipe 31 of larger diameter than the pipe 30, leads through the two rings 19 and 20, also substantially tangentially thereof and on substantially the opposite side of the wheel. The gas in striking the wheel rotates it by impact and travels with it through a portion of the revolution and then escapes through the pipe 31. The wheel 10 is of course positively rotated by the shaft 11, but the exhaust gas from all four cylinders striking the periphery, also positively rotates the wheel and thus aids the engine by utilizing the pressure of the exhaust gas. The number of pockets in the periphery of the wheel is different from the number of cylinders, so that the gas resulting from each explosion will be broken up and delivered through the pipe 31 in separate portions, and the sound of the explosion deadened, if not entirely eliminated. In starting the engine, the wheel 10 is of course positively rotated during the cranking and acts as a suction fan in drawing the gas out of the pipe 31 and creating a partial vacuum in the engine cylinders when the exhaust valves are opened. The wheel thus aids in the introduction of the fresh charge and facilitates the starting of the engine. No separate pumping mechanism need be employed for the cooling water in the jacket of the wheel, as the latter is directly connected with the jacket of the engine. The water may be withdrawn from the jacket of the wheel at any time to prevent damage resulting from the freezing of the water, a suitable drain cock 32 being provided for this purpose.

Having thus described my invention, I claim as new and desire to secure by Letters Patent:

The combination with a fly wheel having a plurality of pockets in the periphery thereof, of two concentric rings encircling said wheel and spaced apart to leave an annular chamber therebetween, the outer ring having a series of transverse ridges in its outer surface, pairs of plates at each end of the wheel and spaced apart to form two annular chambers, the inner plate of each pair being provided with apertures therethrough whereby said last-mentioned chambers may communicate with the first-mentioned annular chamber, each of said plates having a series of outwardly-extending lugs or flanges in the plane thereof and in alinement with said transverse ridges, a peripheral row of bolts extending through said ridges and said lugs or flanges to hold said rings and plates together rigid in respect to each other, inlet and outlet conduits terminating adjacent the periphery of the wheel, and an inlet conduit and an outlet conduit for the chambers between said plates and the chamber between said rings.

In testimony whereof I have signed my name to this specification in the presence of two subscribing witnesses.

JOHN A. LAWSON.

Witnesses:
E. T. CHRISTENSEN,
C. W. FAIRBANK.